(12) United States Patent
Arbuckle et al.

(10) Patent No.: US 9,533,747 B2
(45) Date of Patent: Jan. 3, 2017

(54) SYSTEMS AND METHODS FOR CONTROLLING BATTERY PERFORMANCE IN HYBRID MARINE PROPULSION SYSTEMS

(75) Inventors: Jason S. Arbuckle, Horicon, WI (US); Aaron J. Ward, Oshkosh, WI (US)

(73) Assignee: Brunswick Corporation, Lake Forest, IL (US)

( * ) Notice: Subject to any disclaimer, the term of this patent is extended or adjusted under 35 U.S.C. 154(b) by 823 days.

(21) Appl. No.: 12/849,549

(22) Filed: Aug. 3, 2010

(65) Prior Publication Data

US 2011/0195618 A1 Aug. 11, 2011

Related U.S. Application Data

(60) Provisional application No. 61/302,319, filed on Feb. 8, 2010.

(51) Int. Cl.
| | |
|---|---|
| *H02J 7/04* | (2006.01) |
| *B60L 11/18* | (2006.01) |
| *B63H 21/17* | (2006.01) |
| *B63H 21/20* | (2006.01) |
| *H02J 7/00* | (2006.01) |
| *B63H 23/24* | (2006.01) |

(52) U.S. Cl.
CPC ............ *B63H 21/20* (2013.01); *B63H 21/17* (2013.01); *B63H 23/24* (2013.01); *H02J 7/0078* (2013.01); *H02J 2007/0039* (2013.01); *Y02T 10/7055* (2013.01)

(58) Field of Classification Search
CPC ..... B63H 21/20; B63H 21/17; Y02T 10/7055; Y02T 10/7061; Y02T 10/7066; Y02T 10/7005; H02J 7/0026; H02J 7/0031; H02J 2007/0039; H02J 7/0078

USPC ..... 440/6, 3, 1; 180/65.245, 65.29; 320/104, 320/119, 120, 121
See application file for complete search history.

(56) References Cited

U.S. PATENT DOCUMENTS

| | | | |
|---|---|---|---|
| 1,332,631 A | 3/1920 | Morse | |
| 1,633,454 A | 6/1927 | Mills | |
| 3,230,698 A | 1/1966 | Nettles | |
| 3,503,464 A | 3/1970 | Yardney | |
| 3,566,717 A | 3/1971 | Berman et al. | |
| 3,650,345 A | 3/1972 | Yardney | |
| 3,703,642 A | 11/1972 | Balaguer | |

(Continued)

FOREIGN PATENT DOCUMENTS

| | | |
|---|---|---|
| DE | 101 53 586 A1 | 5/2002 |
| DE | 103 18 293 A1 | 11/2004 |

OTHER PUBLICATIONS

European Search Report for corresponding application EP 11 25 0074, having a completion date of May 31, 2011.

(Continued)

*Primary Examiner* — Andrew Polay
(74) *Attorney, Agent, or Firm* — Andrus Intellectual Property Law, LLP (57) ABSTRACT

A hybrid propulsion system has an internal combustion engine and an electric motor that each selectively powers a marine propulsor to propel a marine vessel. A plurality of batteries discharges current to power the motor. A controller is programmed to aggregate the recharge and/or discharge limits of plurality of batteries and then operate the system according to a method that preferably prevents internal fault and disconnection of batteries in the plurality.

22 Claims, 5 Drawing Sheets

(56) References Cited

U.S. PATENT DOCUMENTS

| | | | |
|---|---|---|---|
| 3,888,325 A | 6/1975 | Reinbeck | |
| 4,233,858 A | 11/1980 | Rowlett | |
| 4,338,525 A | 7/1982 | Kilgore | |
| 5,080,064 A | 1/1992 | Buslepp et al. | |
| 5,081,365 A | 1/1992 | Field et al. | |
| 5,301,764 A | 4/1994 | Gardner | |
| 5,616,056 A | 4/1997 | Meissner | |
| 5,835,876 A | 11/1998 | Hathaway et al. | |
| 5,848,582 A | 12/1998 | Ehlers et al. | |
| 5,880,575 A * | 3/1999 | Itou et al. | 320/122 |
| 5,969,624 A * | 10/1999 | Sakai et al. | 340/636.1 |
| 6,009,371 A | 12/1999 | Kobayashi | |
| 6,133,707 A * | 10/2000 | Kikuchi et al. | 320/104 |
| 6,396,161 B1 | 5/2002 | Crecelius et al. | |
| 6,443,286 B1 | 9/2002 | Bratel et al. | |
| 6,517,464 B2 | 2/2003 | Yamazaki et al. | |
| 6,554,088 B2 | 4/2003 | Severinsky et al. | |
| 6,587,765 B1 | 7/2003 | Graham et al. | |
| 6,662,742 B2 | 12/2003 | Shelton et al. | |
| 6,701,890 B1 | 3/2004 | Suhre et al. | |
| 6,757,606 B1 | 6/2004 | Gonring | |
| 6,758,198 B1 | 7/2004 | Suhre et al. | |
| 6,800,004 B1 | 10/2004 | White et al. | |
| 6,821,171 B1 | 11/2004 | Wynveen et al. | |
| 6,857,918 B1 | 2/2005 | Lebreux et al. | |
| 6,882,129 B2 * | 4/2005 | Boskovitch et al. | 320/119 |
| 6,915,781 B2 | 7/2005 | Rayl | |
| 6,919,711 B2 | 7/2005 | Haydock et al. | |
| 6,978,617 B2 | 12/2005 | Goldmeer et al. | |
| 6,982,632 B2 | 1/2006 | Nagasaka et al. | |
| 7,147,523 B2 | 12/2006 | Mori | |
| 7,241,192 B2 | 7/2007 | Andersen et al. | |
| 7,287,443 B2 | 10/2007 | Kuhstrebe et al. | |
| 7,296,648 B2 * | 11/2007 | Tatara et al. | 180/242 |
| 7,318,396 B1 | 1/2008 | Belter et al. | |
| 7,473,148 B2 | 1/2009 | Ichikawa et al. | |
| 7,473,149 B2 | 1/2009 | Mizokawa | |
| 7,482,767 B2 | 1/2009 | Tether | |
| 7,518,344 B2 | 4/2009 | Sihler | |
| 7,530,864 B2 | 5/2009 | Kaji | |
| 7,556,547 B2 | 7/2009 | Kaji | |
| 7,565,939 B2 * | 7/2009 | Ando et al. | 180/65.28 |
| 7,621,789 B2 | 11/2009 | Mizokawa | |
| 7,769,504 B2 | 8/2010 | Kaji | |
| 7,808,211 B2 | 10/2010 | Pacholok et al. | |
| 7,862,393 B2 | 1/2011 | Levander et al. | |
| 8,039,976 B2 | 10/2011 | Sato et al. | |
| 8,062,081 B2 * | 11/2011 | Barrett et al. | 440/1 |
| 8,290,682 B2 | 10/2012 | Ewert et al. | |
| 8,436,583 B2 * | 5/2013 | Guang et al. | 320/119 |
| 8,453,772 B2 | 6/2013 | Brown | |
| 2002/0005178 A1 | 1/2002 | Iwatani et al. | |
| 2004/0163861 A1 | 8/2004 | Fukuda et al. | |
| 2005/0106953 A1 | 5/2005 | Andersen et al. | |
| 2006/0025025 A1 | 2/2006 | Kitani et al. | |
| 2006/0040791 A1 | 2/2006 | Nakajima et al. | |
| 2006/0096555 A1 | 5/2006 | Buck | |
| 2006/0166573 A1 | 7/2006 | Vetta et al. | |
| 2007/0062744 A1 | 3/2007 | Weidenheimer et al. | |
| 2008/0041327 A1 | 2/2008 | Lewis et al. | |
| 2008/0120516 A1 | 5/2008 | Thor | |
| 2008/0195287 A1 | 8/2008 | Janssen et al. | |
| 2009/0156068 A1 | 6/2009 | Barrett et al. | |
| 2009/0176417 A1 | 7/2009 | Rembach et al. | |
| 2009/0284228 A1 | 11/2009 | Kumar | |
| 2009/0288896 A1 | 11/2009 | Ichikawa | |
| 2009/0302616 A1 | 12/2009 | Peterson | |
| 2010/0075798 A1 | 3/2010 | Suzuki et al. | |
| 2010/0105259 A1 | 4/2010 | Wejrzanowski et al. | |
| 2010/0123436 A1 | 5/2010 | Herrod et al. | |
| 2010/0125383 A1 | 5/2010 | Caouette | |
| 2010/0144219 A1 | 6/2010 | Balogh et al. | |
| 2010/0250041 A1 * | 9/2010 | Li | 701/22 |
| 2011/0021313 A1 | 1/2011 | Steinborn et al. | |
| 2011/0195618 A1 | 8/2011 | Arbuckle et al. | |
| 2011/0237141 A1 | 9/2011 | Tamba | |
| 2013/0274969 A1 | 10/2013 | Wang et al. | |

OTHER PUBLICATIONS

Web Page for PowerCharge Battery Charger HV Series—Overview; http://www.powerdesignersusa.com/powercharge_hv.htm, last visited Jan. 27, 2011 (one page).

Web Page for PowerCharge Battery Charger HV Series—Specifications; http://www.powerdesignersusa.com/powercharge_hv_specs.htm, last visited Jan. 27, 2011 (two pages).

Brochure Page for PowerCharge Battery Charger HV Series and PowerCharge HV Series Product Matrix (two pages).

* cited by examiner

SYSTEMS AND METHODS FOR CONTROLLING BATTERY PERFORMANCE IN HYBRID MARINE PROPULSION SYSTEMS

CROSS-REFERENCE TO RELATED APPLICATION

This application claims the benefit of U.S. Provisional Patent Application No. 61/302,319, filed Feb. 8, 2010, the entirety of which is incorporated herein by reference.

FIELD

The present disclosure is generally related to marine propulsion systems and, more particularly, to hybrid marine propulsion systems.

BACKGROUND

A typical marine vessel has one or more internal combustion engines that drive a propulsor, such as for example a propeller, impeller, pod drive, or the like. The one or more internal combustion engines provide thrust necessary to propel the vessel.

Some marine vessels also include one or more electric motors, which are typically battery-powered motors utilized for trolling.

Abandoned U.S. patent application Ser. No. 11/505,075, expressly incorporated herein by reference, discloses marine propulsion systems that connect both an internal combustion engine and an electric motor to a propulsor in torque-transmitting relation so that the propulsor can selectively receive a sum of the torque provided by the engine and the motor. In these arrangements, a rechargeable electric storage battery unit provides current that powers the motor. The battery unit can include a single battery or a plurality of batteries. To recharge the battery unit, the motor is driven by the engine in torque transmitting relation to generate a current that is discharged to the battery unit. A computer controller commanded by a user input device is programmed to operate the system to, for example, charge the battery unit or alternately to provide electrical power from the battery unit to the motor.

SUMMARY

The present disclosure provides parallel hybrid marine propulsion systems and methods of operating these systems in which one or more electric motors and one or more internal combustion engines are configured to alternately or simultaneously provide power to a propulsor of a marine vessel. More specifically, the present application discloses systems and methods for selectively powering a marine propulsion system with one or more electric motors only, one or more internal combustion engines only, and a combination of one or more motors and one or more engines.

The present application further discloses systems and methods for controlling battery performance in such hybrid marine propulsion systems. More specifically, the present inventors have recognized that is desirable to provide marine propulsion systems with a scalable, rechargeable battery system and related method of providing current to the one or more electric motors in the system. For example, certain examples disclosed herein are scalable such that one or more batteries can be added or removed from a plurality of batteries already connected to the system without negatively affecting operation of the plurality of batteries or the remaining components of the system. These examples can be used with systems having one or more electric motors and/or one or more internal combustion engines. Certain examples are configured to accommodate for changes/degradation in battery state that commonly occur over the useful life of a rechargeable battery, thus facilitating more predictable and reliable operation of a hybrid marine propulsion system.

In one example, a hybrid propulsion system has an internal combustion engine and an electric motor that each selectively powers a marine propulsor to propel a marine vessel. A plurality of batteries discharge current to power the electric motor. A controller is programmed to aggregate the recharge and/or discharge limits of the plurality of batteries and then operate the system in such as way as to prevent internal fault or disconnection of any of the batteries in the plurality. One or more batteries can be added or removed from the plurality of batteries without negatively affecting operation of the batteries or the remaining components of the system.

In another example, a hybrid propulsion system comprises a marine propulsor that propels a marine vessel; an internal combustion engine that selectively powers the marine propulsor; an electric motor that selectively powers the marine propulsor; a plurality of batteries that discharge current to power the electric motor; and a controller that operates the system in a plurality of modes including at least a charge mode in which output of the internal combustion engine is used to generate current to charge the plurality of batteries. In the charge mode, each battery in the plurality of batteries disconnects from the electric motor if more than a limited amount of current is received by that respective battery. The controller calculates a cumulative charge limit for the plurality of batteries by aggregating the limited amounts of current of the plurality of batteries and then controls operation of the system in charge mode so as not to exceed the cumulative charge limit, thereby preventing disconnection of the plurality of batteries.

In another example, a method of operating a hybrid propulsion system having an internal combustion engine and an electric motor that each selectively power a marine propulsor to propel a marine vessel comprises (1) providing a plurality of batteries that discharge current to power the electric motor; (2) operating an internal combustion engine to generate current to charge the plurality of batteries, wherein each battery in the plurality of batteries disconnects from the electric motor if more than a limited amount of current is received by that respective battery; (3) operating a controller to aggregate the limited amounts of current of the plurality of batteries; and (4) operating the system so as not to exceed the aggregated amounts of current of the plurality of batteries, thereby preventing disconnection of the plurality of batteries.

In another example, a hybrid propulsion system comprises a marine propulsor that propels a marine vessel; an internal combustion engine that selectively powers the marine propulsor; an electric motor that selectively powers the marine propulsor; a plurality of batteries that discharge current to power the electric motor; and a controller operating the system in a plurality of modes including at least one of an electric mode in which the electric motor powers the marine propulsor and a boost mode in which both the internal combustion engine and the electric motor provide power to the marine propulsor. Each battery in the plurality of batteries disconnects from the electric motor if it discharges more than a limited amount of current. The controller calculates a cumulative discharge limit for the plurality of batteries by aggregating the limited amounts of current of the plurality of batteries and then operates the system so as not to exceed the cumulative discharge limit, thereby preventing disconnection of the plurality of batteries.

In another example, a method of operating a hybrid propulsion system having an internal combustion engine and an electric motor that each selectively power a marine propulsor to propel a marine vessel comprises: (1) providing a plurality of batteries that discharge current to power the electric motor; (2) operating the electric motor to draw current from the plurality of batteries, wherein each battery in the plurality of batteries disconnects from the electric motor if more than a limited amount of current is discharged by that respective battery; (3) operating a controller to aggregate the limited amounts of current of the plurality of batteries; and (4) operating the system so as not to exceed the aggregated amount of current of the plurality of batteries, thereby preventing disconnection of the plurality of batteries.

Various other examples are disclosed and claimed herein.

DETAILED DESCRIPTION

In the present description, certain terms have been used for brevity, clearness and understanding. No unnecessary limitations are to be implied therefrom beyond the requirement of the prior art because such terms are used for descriptive purposes only and are intended to be broadly construed. The different systems and methods described herein may be used alone or in combination with other systems and methods. Various equivalents, alternatives and modifications are possible within the scope of the appended claims. Each limitation in the appended claims is intended to invoke interpretation under 35 U.S.C. §112, sixth paragraph only if the terms "means for" or "step for" are explicitly recited in the respective limitation.

Figure 1:
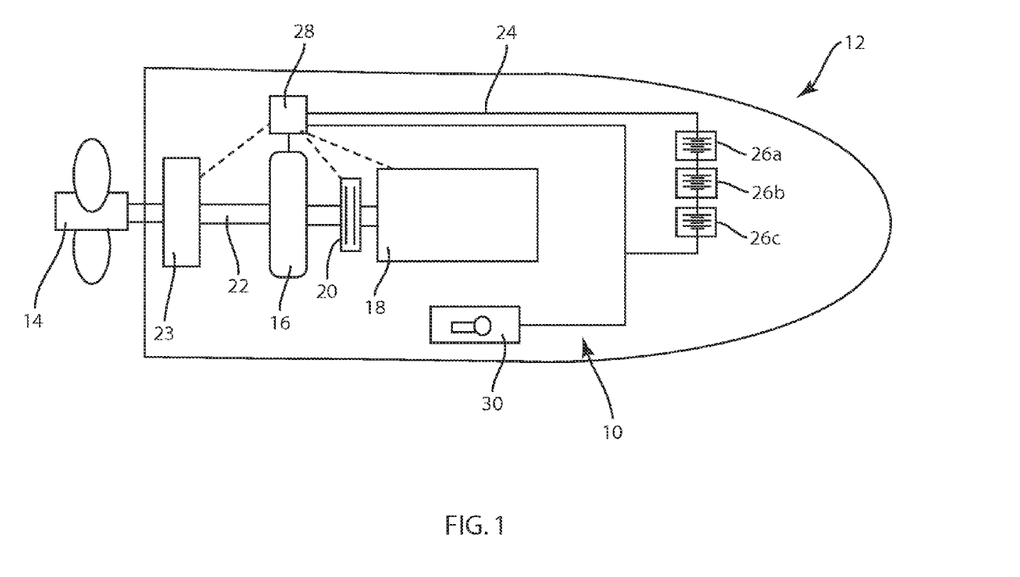
FIG. 1 is a schematic depiction of a marine vessel having a hybrid marine propulsion system.

FIG. 1 depicts a hybrid marine propulsion system 10 for a marine vessel 12. The system 10 includes among other things one or more propulsors 14 (collectively referred to herein as "propulsor"), which can include any type of device for propelling the marine vessel 12 including but not limited to one or more propellers (as shown in FIG. 1), impellers, stern drives, pod drives, and/or the like. The propulsor 14 is selectively driven by one or more electric motors 16 (collectively referred to herein as "motor"), one or more internal combustion engines 18 (collectively referred to herein as "engine"), and a combination of the electric motor 16 and engine 18. In the example shown, the system 10 also includes one or more clutches 20 (collectively referred to herein as "clutch") for selectively connecting and disconnecting the engine 18 from a driveshaft 22 that extends from the engine 18 to a transmission 23 for driving the propulsor 14. The engine 18 can include a diesel engine or any other type of engine for providing power to the propulsor 14. The clutch 20 can include any type of clutch for connecting and disconnecting the engine 18 and driveshaft 22, such as for example a friction clutch, or more preferably a dog clutch because the speeds of the motor 16 and engine 18 are typically synchronized (i.e. substantially matched) before the clutch 20 is engaged or disengaged.

The motor 16 is located between the clutch 20 and transmission 23 and is configured to drive driveshaft 22 at the same time or separately from the engine 18. In the example shown, the driveshaft 22 extends through and forms a part of the motor 16; however, arrangements where the motor 16 and driveshaft 22 are separate components are also contemplated and should be considered part of this disclosure. Together, the engine 18, clutch 20, motor 16 and transmission 23 provide forward, neutral, and reverse operations of propeller 14 in a "parallel" drive arrangement; however it should be recognized that the examples shown and described are not limiting and that the concepts discussed and claimed herein are applicable to other types of parallel and non-parallel hybrid marine propulsion configurations.

The system 10 further includes a plurality of rechargeable storage batteries 26a, 26b, 26c, which are connected in electrical communication with the motor 16 and discharge current to power the motor 16. In FIG. 1, three batteries 26a, 26b, 26c are shown connected in series with each other and to system 10; however as will be described further herein below the number of batteries 26 and the configuration thereof can be easily modified.

In a preferred arrangement, the motor 16 is also operable as a generator to recharge the batteries 26. In this arrangement, the motor 16 is connectable in torque transmitting relation with, and driven by, the engine 18, which in turn provides a supply of current for recharging batteries 26a, 26b, 26c. This will be described further herein below.

Figure 2:
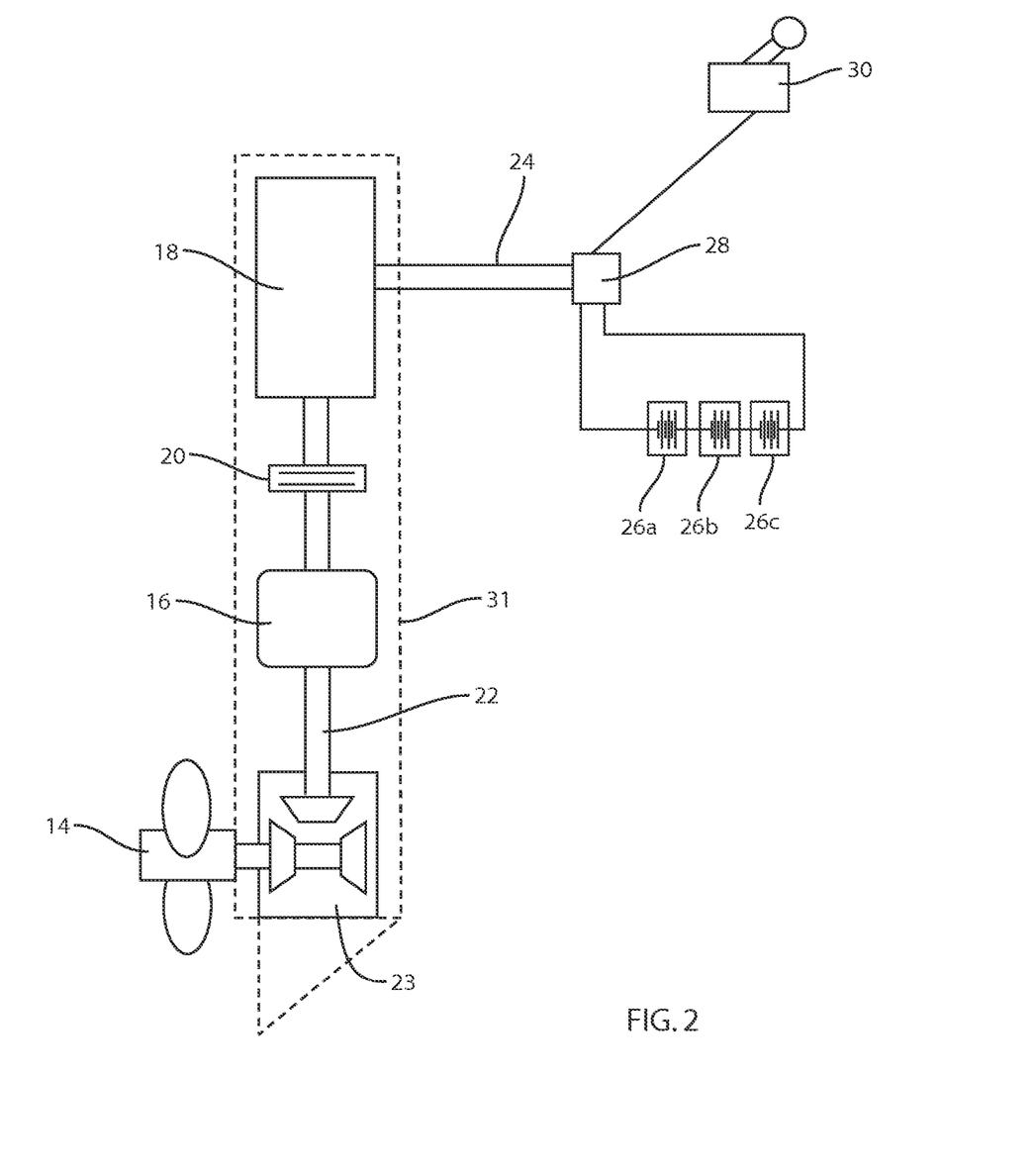
FIG. 2 is a schematic depiction of a marine vessel having a hybrid marine propulsion system configured as an outboard motor.

FIG. 1 depicts an inboard/outboard marine arrangement; however the concepts disclosed in this application are applicable to any type of marine propulsion system, such as for example an outboard motor arrangement. FIG. 2 depicts an outboard motor 31 according to such an arrangement, having reference numbers corresponding to the structures described with reference to FIG. 1.

Figure 3:
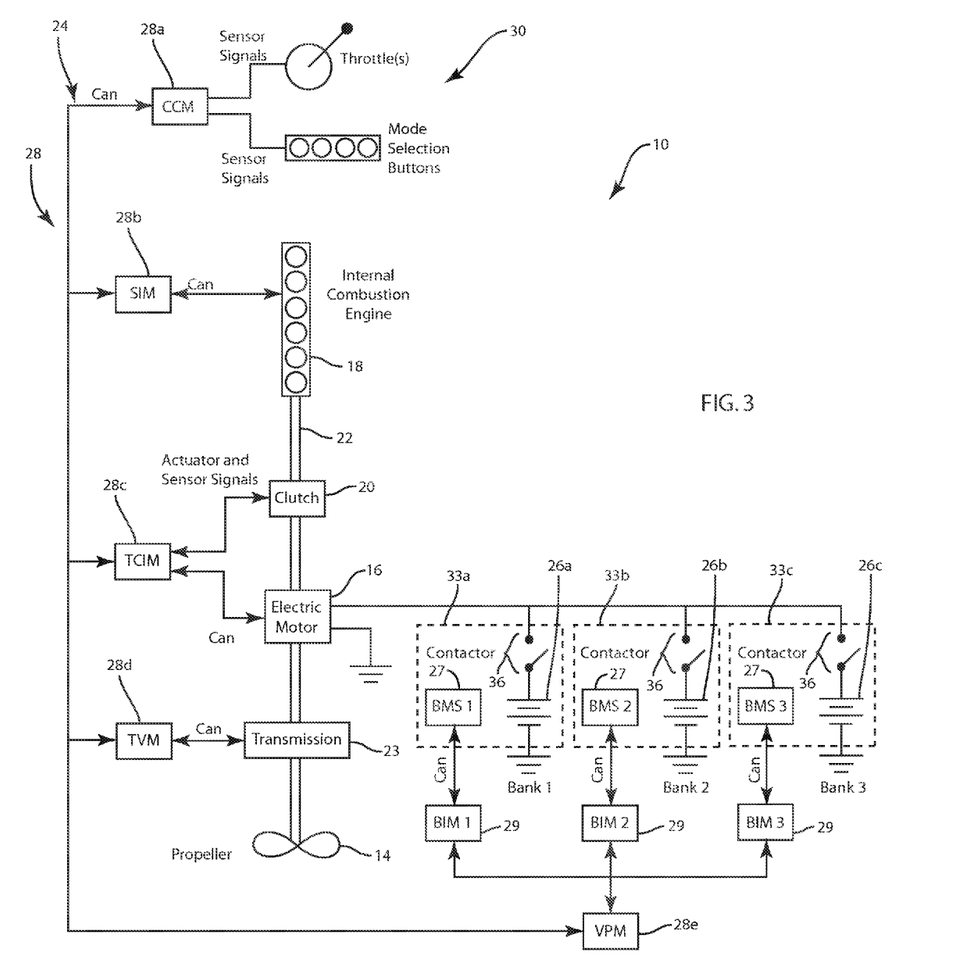
FIG. 3 is a schematic depiction of a hybrid marine propulsion system.

Referring to FIG. 3, the system 10 also includes a controller 28 connected to a controller area network 24 (CAN) for operating the system 10 in a plurality of operational modes. The controller 28 is shown schematically and includes a plurality of controller sections 28a-28e, each section having a memory and processor for sending and receiving electronic control signals, for communicating with other controllers in the controller area network 24, and for controlling operations of certain components in the system 10 such as the engine 18, clutch 20, and motor 16. The programming and operations of the controller 28 and its sections 28a-28e are described in further detail below with respect to non-limiting examples and/or algorithms. While each of these examples/algorithms includes a specific series of steps for accomplishing certain system control functions, the scope of this disclosure is not intended to be bound by the literal order or literal content of steps described herein, and non-substantial differences or changes still fall within the scope of the disclosure. Also, the configuration of the controller area network 24, controller 28, and sections 28a-28e can vary significantly. For example, the controller 28 does not need to include separately located sections and can instead comprise a single control device located at one location. Conversely the controller 28 can include more sections than those shown and sections located at different locations than those shown.

In the example shown, the controller 28 includes a command control section 28a (CCM) that is configured to receive user inputs via the controller area network 24 from a user input device 30. The user input device 30 is shown in FIGS. 1 and 2 as a conventional combination throttle/shift lever and in FIG. 3 including a plurality of mode selection buttons; however, the user input device 30 is not limited to these configurations and can additionally or alternately comprise other devices for inputting commands to the system 10, such as fewer or more input keys than that shown, or joysticks, touch screens, and/or the like. Actuation of the user input device 30 is sensed by sensors (not shown) and communicated to command control section 28a via the controller area network 24.

The command control section 28a is programmed to convert the user inputs into electronic commands and then send the commands to other controller sections in the system 10. These other controller sections include a transmission/engine controller (SIM) 28b that controls engine/transmission/shifting and reads signals regarding transmission state and output speed; a thermal, clutch motor interface module (TCIM) 28c that controls the cooling system, clutch 20, and provides communication interface between the controller area network 24 and a controller section (not shown) for the motor 16; and a drive control module (TVM) 28d that receives commands from the command control section 28a and controls for example a pod drive to a particular steering angle. Again, the controller area network 24 shown in FIG. 3 is exemplary and could be significantly changed and still fall within the scope of the present disclosure and achieve the system functional activities set forth herein.

During operation of the marine vessel 12, the controller 28 is programmed to switch amongst three primary modes of control, namely (1) an Engine Mode, wherein the engine 18 is connected to the propulsor 14 by the clutch 20 and all of the driving force to the propulsor 14 is provided by the engine 18; (2) an Electric Mode, wherein the motor 16 is connected to the propulsor 14 and all of the driving force to the propulsor 14 is provided by the motor 16; and (3) a Hybrid Mode wherein both the engine 18 and the motor 16 are connected to the propulsor 14 and the driving force to the propulsor 14 is provided by a combination of the engine 18 and the motor 16. In addition, it is sometimes desirable to operate a hybrid "Boost Mode" in which the engine 18 provides the primary driving force to the propulsor 14 while an additional "boost" driving force is temporarily provided by the motor 16 for temporary increased performance. Also, as discussed above, when the engine 18 is providing output to the system 10, the controller 28 can operate a Charge Mode wherein the motor 16 is controlled to perform as a generator, thereby providing a recharge current to the batteries 26a, 26b, 26c. Charge Mode typically occurs during Hybrid Mode operation, for example, when both the motor 16 and engine 18 are connected in parallel via the driveshaft 22. Which mode of operation is utilized at any given time can depend upon the specific operating conditions of the vessel 12 or can be based upon user inputs provided by the user input device 30.

The system 10 disclosed herein is configured to provide switching between the various modes of operation while the engine 18 is running and/or while the motor 16 is running and with the propulsor 14 in neutral or in gear. For example, it is often desirable to switch into Electric Mode when operating the vessel 12 at low speeds to thereby provide quieter vessel operation and more fuel-efficient vessel operation. It is often desirable to switch into Hybrid Mode, and more specifically Charge Mode, when the power of the plurality of batteries 26a, 26b, 26c is low to thereby draw recharging current from the engine 18.

Referring to FIG. 3, each battery 26a, 26b, 26c is part of a battery bank 33a, 33b, 33c that also includes a monitor 27 (BMS) that reads signals from the individual batteries and a contactor 36 that is configured to connect and disconnect the respective battery 26a, 26b, 26c from the system 10. Each contactor 36 is configured such that if for example more than a predetermined amount of current is received by that respective battery during recharging or if the battery discharges more than a predetermined amount of current to the system 10 to power the motor 16, the contactor 36 opens and the battery is disconnected from the system 10. User intervention is typically required thereafter to reconnect the battery to the system 10. This type of battery is conventional and commercially available for example from Valence Technology Inc.

The batteries 26a, 26b, 26c thus have limits on the amount of current that can be drawn from or put into them. The limits can change over time based on the battery's state of charge, voltage, temperature, and several other parameters. Additionally, the number of batteries installed in the system 10 can greatly affect the current limits. The present inventors have recognized that since these limits can change, the system 10 preferably should manage the current into and out of the batteries in order to avoid damaging the batteries. Conventional automotive hybrid systems use a known set of batteries and thus do not allow scaling of the batteries. Because of this, the current limiting arrangements of these systems do not function properly with changes in battery conditions. Conventional hybrid marine propulsion systems also do not function properly with such changes in battery conditions.

The present inventors have recognized that it is desirable to provide a control system 10 that operates so as to prevent disconnection of the batteries by not exceeding the noted current limits. The present inventors have also recognized that it is desirable to provide hybrid marine systems and methods that facilitate adding or subtracting batteries from the system 10 to increase or decrease available electric power while at the same time avoiding overloading the batteries with current, thus preventing disconnection. The present inventors have also recognized that it is desirable to provide a control system 10 that adapts to prevent disconnection of operable batteries in a plurality of batteries when one or more batteries in the plurality enters a faulty state.

In the system 10 depicted in FIG. 3, each monitor 27 is connected to a respective battery interface module 29 (BIM), which is in turn connected to a controller section referred to as a vessel power module 28e (VPM), also referred to herein after as a "calculation section" 28e. The calculation section 28e controls operation of the battery banks 33a, 33b, 33c via the respective battery interface modules 29 and also serves as an interface to other controller sections in the system 10. It should be noted that the battery interface modules 29 are not an essential part of the controller area network 24 and could be eliminated from the system 10 by changing the (conventional) controller area network link City ID of the monitors 27. The battery interface modules 29 could also be eliminated from the controller area network 24 if a separate module was instead implemented that incorporated four controller area network buses.

The system 10 thus includes a current limiting arrangement that can work with single or multiple engine/motor (generator) configurations. Specifically, the calculation section 28e communicates via the controller area network 24 with each battery bank 33a, 33b, 33c. Each battery bank 33a, 33b, 33c reports to the calculation section 28e a maximum charge current and maximum discharge current that will cause that particular battery to fault, i.e. cause an opening of contactor 36 and thus disconnection of the respective battery 26a, 26b, 26c from the system 10. The calculation section 28e is programmed to aggregate (sum) this information from each battery bank 33a, 33b, 33c in the plurality to calculate a cumulative charge limit and a cumulative discharge limit. This allows batteries to be added to or removed from the system 10 without affecting the operations of the rest of the batteries 26 in the plurality or the rest of the system 10 components. This also allows the system 10 to adapt when one or more batteries experience a fault. This also allows the system 10 to adapt when additional engine/generator combinations in the system 10 become operable. Specifically, each time a battery is added or subtracted from the system 10, the calculation section 28e accommodates the change by receiving the charge limit and discharge limit of that respective battery and accounting for those values in the aggregate totals for the plurality of batteries. If a new battery is added to the system, its charge limit and discharge limit are added to the aggregate. If a battery is removed from the system, its charge limit and discharge limit are subtracted from the aggregate. Further, the system 10 accommodates changes in the charge limits and discharge limits of existing batteries in the same manner, such changes occurring for example as a result of degradation of the battery over time.

The aggregated charge limit and aggregated discharge limit are utilized by the controller 28 to control operation of the system 10 to optimize performance of the batteries 26a, 26b, 26c, etc. and to preferably prevent disconnection thereof from the system 10. In one example, the controller 28, and specifically the calculation section 28e calculates the cumulative charge limit and the cumulative discharge limit and these values are utilized as follows:

Maximum Charge Current Limit

Figure 4:
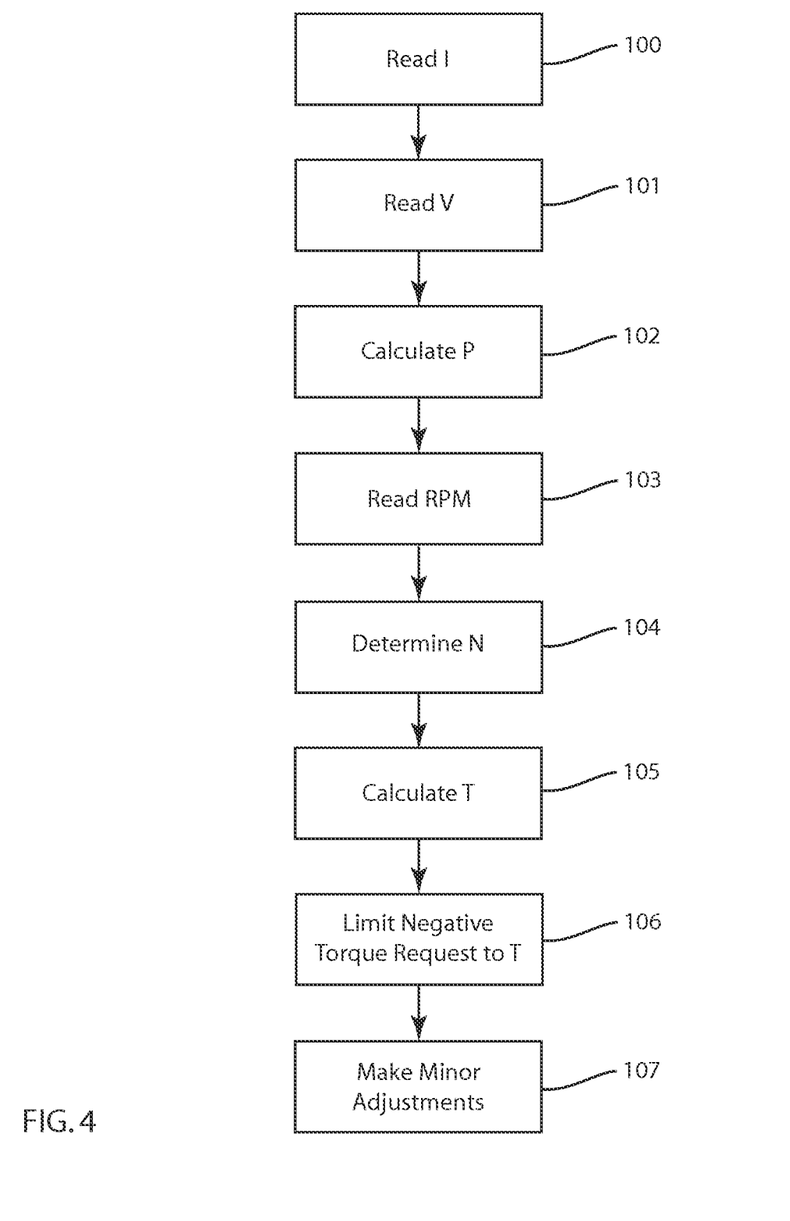
FIG. 4 is a flow chart depicting one example of a method for controlling a hybrid marine propulsion system.

As discussed above, during typical system operation it may be necessary to recharge the batteries 26a, 26b, 26c via a Charge Mode wherein the motor 16 is controlled to perform as a generator, thereby providing a recharge current to the batteries 26a, 26b, 26c, etc. During such recharging, a "negative torque request" is made by the controller 28 wherein the motor 16 generates current from the power provided by the engine 18. This negative torque request causes a recharge current to be discharged to the batteries 26a, 26b, 26c, etc. The controller 28 is advantageously programmed to limit recharging current and thus avoid disconnection of the batteries 26a, 26b, 26c, etc. In one example shown in FIG. 4, the controller 28 operates the system so as to limit a negative motor torque request to equal to or less than a maximum allowed negative motor torque (T) calculated based upon the aggregated amounts of current limits of the plurality of batteries 26a, 26b, 26c, etc. Specifically, with reference to steps 100-107, the controller 28 operates to:

100. Read the maximum recharge current from the calculation section 28e ("I" in this example).

101. Read the voltage of the batteries that are being recharged from the calculation section ("V" in this example).

102. Calculate the maximum recharge power allowed in watts ("P" in this example) using: $P=I \cdot V$.

103. Read the speed of the motor 16 from the controller section 28c ("RPM" in this example).

104. Determine the number of engine/generator combinations that are running ("N" in this example). This is done by determining whether or not the engine 18 is running and the motor/generator 16 is capable of running.

105. Calculate the maximum allowed torque ("T" in this example) using: $T=(P \cdot 60)/(RPM \cdot 2 \cdot pi \cdot N \cdot \eta)$, where $\eta$ is a function of the efficiency of the electric motor.

106. Limit the negative torque request to the value T calculated in step 105.

107. A PID could then be used to make minor adjustments to the torque limit to control current if needed.

Maximum Discharge Current Limit

During several modes of operation, the system 10 operates to drive the propulsor 14, as described above. When the motor 16 is operated to provide all of or a portion of a requested thrust, the motor 16 is drawing current out of the batteries 26a, 26b, 26c to generate power. Typically, battery discharge occurs in at least Electric Mode and Boost Mode. In Electric Mode, the motor 16 is placed in a "speed-torque" control which allows both a speed and torque set point to be utilized by the controller 28. During Boost Mode, the motor 16 is placed in torque control and a positive torque request is made by controller 28. In both of these situations, the controller 28 functions to prevent disconnection of the plurality of batteries 26a, 26b, 26c, etc. based upon the aggregated amounts of current allowed for discharge by the batteries 26a, 26b, 26c, etc. In one specific example, the controller 28 operates the system 10 so that a motor torque request that requires discharge of current from the plurality of batteries 26a, 26b, 26c is equal to or less than a maximum allowed motor torque (T) calculated based upon the above-described cumulative discharge limit of the plurality of batteries 26a, 26b, 26c. This can occur in both Electric Mode and Boost Mode.

Figure 5:
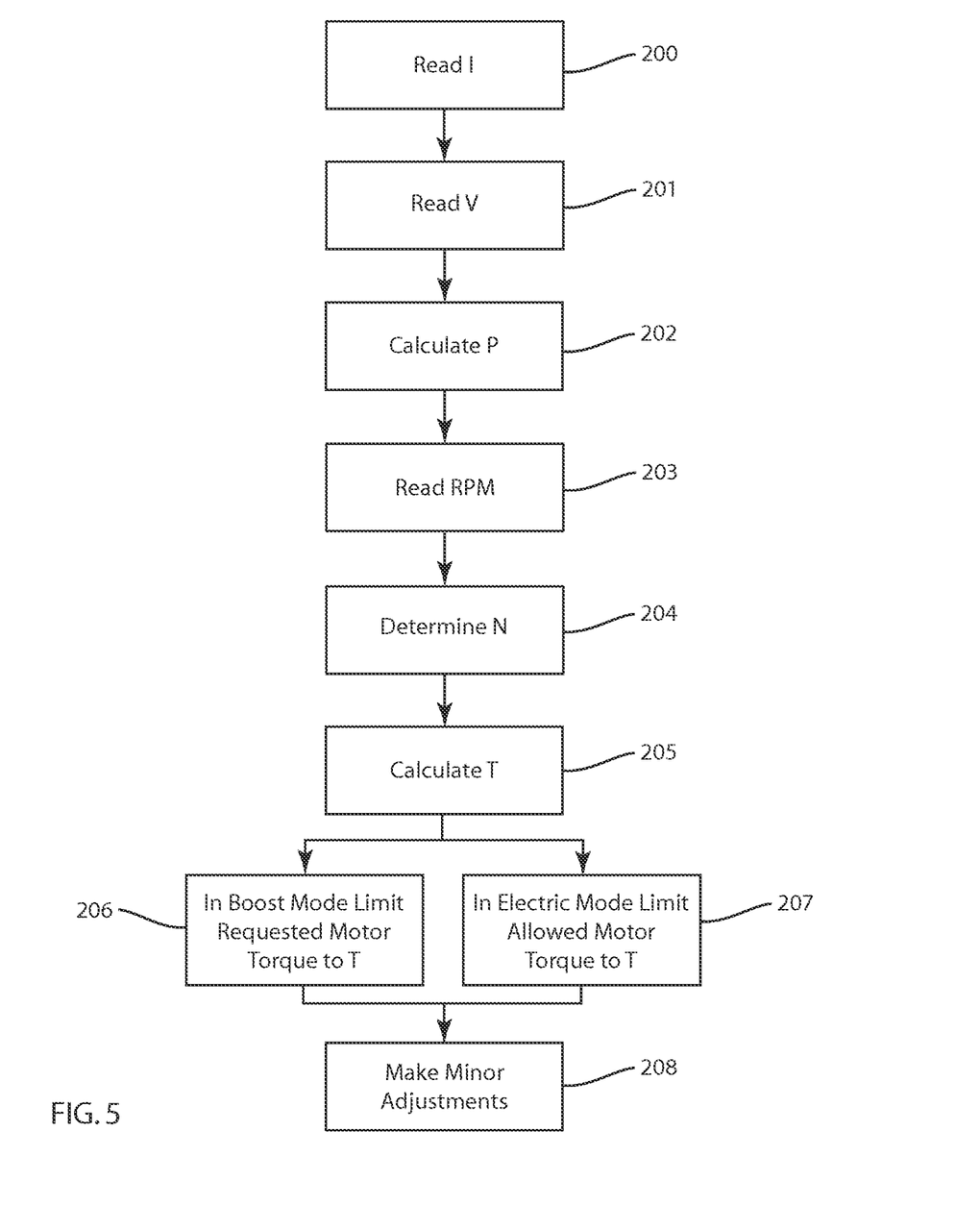
FIG. 5 is a flow chart depicting another example of a method for controlling a hybrid marine propulsion system.

With reference to FIG. 5, the controller 28 operates the system 10 in one example according to steps 200-208 as follows:

200. Read the minimum discharge current from the calculation section 28e ("I" in this example).

201. Read the voltage of the batteries that are being discharged from the calculation section 28e ("V" in this example).

202. Calculate the maximum discharge power allowed in watts ("P" in this example) using: $P=I \cdot V$.

203. Read the speed of the motor 16 from the controller section 28c ("RPM" in this example).

204. Determine the number of engine/generator combinations that are running ("N" in this example). This is done by determining whether or not the engine 18 is running and the motor/generator 16 is capable of running.

205. Calculate the maximum allowed torque ("T" in this example) using: $T=(P \cdot 60)/(RPM \cdot 2 \cdot pi \cdot N \cdot \eta)$, where $\eta$ is a function of the efficiency of the electric motor).

Limit:

206. the requested motor torque to the value T calculated in step 205 if the motor 16 is running in Boost Mode.

207. the allowed motor torque to the value T calculated in step 205 if the motor 16 is running Electric Mode.

208. A PID could then be used to make minor adjustments to the torque limit to control current if needed.

The above-described system 10 and method thus provide the ability to properly handle multiple engine/generator combinations and to properly scale the discharge of current from and to a plurality of batteries in the system. The system 10 and method can also deal with batteries that have taken themselves "offline" (this reduces the charge and discharge current limits) due to an internal battery fault. The system 10 and method can be seamlessly integrated into an overall hybrid control strategy in such a way that it is nearly imperceptible to the user.

What is claimed is:

1. A hybrid marine propulsion system comprising:
a marine propulsor that propels a marine vessel;
an internal combustion engine that selectively powers the marine propulsor;
an electric motor that selectively powers the marine propulsor;
a plurality of batteries that discharge current to power the electric motor;
a controller that operates the system in a plurality of modes including at least a charge mode in which output of the internal combustion engine is used to generate current to charge the plurality of batteries; and
a contactor for each battery in the plurality of batteries, wherein each contactor independently disconnects a respective battery in the plurality of batteries from the electric motor in a manner that discontinues charging of that respective battery by the electric motor when during charge mode more than a limited amount of current is received by that respective battery;
wherein the controller calculates a cumulative charge limit for the plurality of batteries equal to an aggregate of said limited amounts of current of the plurality of batteries, and then controls operation of the system in charge mode so as not to exceed the cumulative charge limit, thereby preventing disconnection of any of the batteries in the plurality of batteries.

2. A system according to claim 1, wherein the controller operates the system in charge mode so that a negative motor torque for recharging the plurality of batteries is equal to or less than a maximum allowed negative motor torque (T) calculated based upon the cumulative charge limit.

3. A system according to claim 2, wherein the controller calculates the maximum allowed negative motor torque (T) by solving the equation:

$$T = P*60/(RPM*2*pi*N)$$

where (P) is a maximum allowable recharge power of the plurality of batteries, (RPM) is the speed of the electric motor, and (N) is the number of internal combustion engines running in the system.

4. A system according to claim 3, wherein the controller calculates the maximum allowable recharge power (P) by solving the equation:

$$P = (I*V)$$

where (I) is the cumulative charge limit and (V) is the cumulative voltage of the plurality of batteries.

5. A system according to claim 1, further comprising a plurality of internal combustion engines, each having an associated generator for charging the plurality of batteries.

6. A system according to claim 1, wherein the controller comprises a plurality of sections interconnected via a controller area network, each section in the plurality of sections performing different controller functions and communicating with other sections in the plurality of sections via the controller area network.

7. A system according to claim 6, wherein the plurality of sections comprises a calculation section that calculates the cumulative charge limit by aggregating the limited amounts of current of the plurality of batteries.

8. A method of operating a hybrid propulsion system having an internal combustion engine and an electric motor that each selectively power a marine propulsor to propel a marine vessel, the method comprising:
providing a plurality of batteries that discharge current to power the electric motor;
generating current from output of the internal combustion engine to charge the plurality of batteries, wherein a contactor is provided for each battery in the plurality of batteries, wherein each contactor independently disconnects a respective battery in the plurality of batteries from the electric motor in a manner that discontinues charging of that respective battery by the electric motor when more than a limited amount of current is received by that respective battery;
operating a controller to aggregate said limited amounts of current of the plurality of batteries; and
operating the system so as not to exceed the aggregated amount of current of the plurality of batteries, thereby preventing disconnection of any of the batteries in the plurality of batteries.

9. A method according to claim 8, comprising operating the system so as to limit a negative motor torque request to equal to or less than a maximum allowed negative motor torque (T) calculated based upon the aggregated amount of current of the plurality of batteries.

10. A hybrid marine propulsion system comprising:
a marine propulsor that propels a marine vessel;
an internal combustion engine that selectively powers the marine propulsor;
an electric motor that selectively powers the marine propulsor;
a plurality of batteries that discharge current to power the electric motor;
a controller that operates the system in a plurality of modes including at least one of an electric mode in which the electric motor powers the marine propulsor and a boost mode in which both the internal combustion engine and the electric motor provide power to the marine propulsor; and
a contactor for each battery in the plurality of batteries, wherein each contactor disconnects a respective battery in the plurality of batteries from the electric motor in a manner that discontinues discharging that respective battery to the electric motor when during electric mode more than a limited amount of current is discharged from that respective battery;
wherein the controller calculates a cumulative discharge limit for the plurality of batteries equal to an aggregate of said limited amounts of current of the plurality of batteries and then operates the system so as not to exceed the cumulative discharge limit, thereby preventing disconnection of any of the batteries in the plurality of batteries.

11. A system according to claim 10, wherein the controller operates the system so that a motor torque requiring discharge of current from the plurality of batteries is equal to or less than a maximum allowed motor torque (T) calculated based upon the cumulative discharge limit.

12. A system according to claim 11, wherein the motor torque requiring discharge of current from the plurality of batteries is a requested motor torque for operating boost mode.

13. A system according to claim 11, wherein the motor torque requiring discharge of current from the plurality of batteries is an allowed motor torque for operating electric mode.

14. A system according to claim 11, wherein the controller calculates the maximum allowed motor torque (T) by solving the equation:

$$T=P*60/(RPM*2*pi*N)$$

where (P) is a maximum allowable discharge power of the plurality of batteries, (RPM) is the speed of the electric motor, and (N) is the number of internal combustion engines running in the system.

15. A system according to claim 14, wherein the controller calculates the maximum allowable discharge power (P) by solving the equation:

$$P=(I*V)$$

where (I) is the cumulative discharge limit and (V) is the cumulative voltage of the plurality of batteries.

16. A system according to claim 10, further comprising a plurality of internal combustion engines, each being connectable to an associated generator for charging the plurality of batteries.

17. A system according to claim 10, wherein the controller comprises a plurality of sections interconnected via a controller area network, each section in the plurality of sections performing different controller functions and communicating with other sections in the plurality of sections via the controller area network.

18. A system according to claim 17, wherein the plurality of sections comprises a calculation section that calculates the cumulative discharge limit by aggregating the limited amounts of current of the plurality of batteries.

19. A method of operating a hybrid propulsion system having an internal combustion engine and an electric motor that each selectively power a marine propulsor to propel a marine vessel, the method comprising:

providing a plurality of batteries that discharge current to power the electric motor;

operating the electric motor to draw current from the plurality of batteries, wherein a contactor is provided for each battery in the plurality of batteries, wherein each contactor independently disconnects a respective battery in the plurality of batteries from the electric motor in a manner that discontinues discharging of that respective battery to the electric motor when more than a limited amount of current is discharged from that respective battery;

operating a controller to aggregate said limited amounts of current of the plurality of batteries; and operating the system so as not to exceed the aggregated limited amounts of current of the plurality of batteries, thereby preventing disconnection of any of the batteries in the plurality of batteries.

20. A method according to claim 19, comprising operating the system so that a motor torque requiring discharge of current from the plurality of batteries is equal to or less than a maximum allowed motor torque (T) calculated based upon the cumulative discharge limit.

21. A method according to claim 20, wherein the motor torque requiring discharge of current from the plurality of batteries is a requested motor torque for operating a boost mode in which both the internal combustion engine and electric motor provide power to the marine propulsor.

22. A method according to claim 20, wherein the motor torque requiring discharge of current from the plurality of batteries is an allowed motor torque for operating an electric mode in which the electric motor powers the marine propulsor.

* * * * *